United States Patent [19]
Feldman et al.

[11] Patent Number: 5,626,140
[45] Date of Patent: May 6, 1997

[54] SYSTEM AND METHOD OF MULTI-SENSOR FUSION OF PHYSIOLOGICAL MEASUREMENTS

[75] Inventors: Jeffrey M. Feldman, Mount Laurel, N.J.; Mehboob H. Ebrahim, Philadelphia, Pa.

[73] Assignee: SpaceLabs Medical, Inc., Redmond, Wash.

[21] Appl. No.: 551,522

[22] Filed: Nov. 1, 1995

[51] Int. Cl.$^6$ ........................................ A61N 1/36
[52] U.S. Cl. .................... 128/671; 128/670; 128/668; 607/17
[58] Field of Search ...................... 128/671, 670, 128/668, 696, 706–710; 607/17–20, 119–129

[56] References Cited

U.S. PATENT DOCUMENTS

| | | | |
|---|---|---|---|
| 5,387,229 | 2/1995 | Poore | 607/18 |
| 5,413,592 | 5/1995 | Schroeppel | 607/18 |
| 5,423,869 | 6/1995 | Poore et al. | 607/18 |
| 5,476,503 | 12/1995 | Yang | 607/129 |
| 5,511,042 | 4/1996 | O'Brien, Jr. | 367/135 |

Primary Examiner—Angela D. Sykes
Assistant Examiner—Stephen Huang
Attorney, Agent, or Firm—Seed and Berry LLP

[57] ABSTRACT

A system and method for fusing independent measures of the physiological parameter uses a Kalman filter for each possible combination of sensor measurements. The Kalman filter utilize probability density functions of a nominal error contamination model and a prediction error model as well as past estimates of the physiological parameter to produce the Kalman filter outputs. A confidence calculator uses Bayesian statistical analysis to determine a confidence level for each of the Kalman filter outputs, and selects a fused estimate for the physiological parameter based on the confidence level. The fused estimate and the confidence level are used to dynamically update the nominal error contamination model and prediction error model to create an adaptive measurement system. The confidence calculator also takes into account the probability of artifactual error contamination in any or all of the sensor measurements. The system assumes a worst case analysis of the artifactual error contamination, thus producing a robust model able to adapt to any probability density function of the artifactual error and a priori probability of artifact.

36 Claims, 3 Drawing Sheets

SYSTEM AND METHOD OF MULTI-SENSOR FUSION OF PHYSIOLOGICAL MEASUREMENTS

TECHNICAL FIELD

The present invention relates generally to physiological measurements and, more specifically, to a system and method for sensor fusion using multiple physiological sensors.

BACKGROUND OF THE INVENTION

Physiological measurements provide a physician or other medical professional with a quantitative indication of the patient's condition. A variety of different sensors provide physiological measurements of many different physiological events. Some of the sensors may provide a measurement of the same physiological event. For example, heart rate can be determined from an electrocardiograph (ECG) machine, but may also be derived from other sensors.

It is known that a patient's present heart rate can only be measured from various physiological signals. For example, the ECG provides a measure of heart rate over a predetermined period of time. The heart rate estimate is derived by measuring the interval between heartbeats for the predetermined period of time, and performing mathematical calculations based on the interval measurements to derive the heart rate estimate. However, the ECG signal may have been contaminated by noise during the predetermined period resulting in an error in the heart rate measurement. Thus, no measurement system can provide a heart rate measurement with complete assurance of accuracy. Other sensors attached to the human body can also estimate heart rate based on a variety of physiologically-based signals. For example, a blood pressure monitor, or pulse oximeter can be used to derive a heart rate estimate.

Each of these physiologically-based signals is subject to interference such as patient movement, patient breathing, or electrical interference. If the level of the interference is sufficiently low with respect to the signal, the signal may still provide accurate data although there may be some acceptable level of error. If the interference is at a relatively high level, the signal may no longer provide accurate data. These high-level interference sources tend to result in a measurement with an unacceptably high level of error and is therefore called "artifact." When excessive interference is present at a particular sensor, that sensor will suddenly provide an incorrect physiological measurement (i.e., artifact) from the perspective of the observer, who is usually a physician or other skilled expert. In order to determine which of the multiple sensors are providing acceptable or consistent observations, the observer relies on his experience and knowledge about: (1) the nature of physiological parameter being measured and its variability from a physiological perspective; (2) the susceptibility of different sensors to various types of error, and particularly to artifact; and (3) consensus among the various sensor measurements. Thus, the observer must analyze the data from each sensor and manually determine the correct value based on his judgment as to the most reliable measurement. The observer also uses his own knowledge of the parameter's characteristics as well as experience gained in monitoring the specific patient to determine the correct value. Such manual analysis and decision making requires a significant amount of time on the part of the observer.

Therefore, it can be appreciated that there is a significant need for a system and method for automatically analyzing physiological data from various sensors to determine a reliable measure of the physiological event without the interpretation of different measurements by the observer. The present invention provides this and other advantages as will be apparent from the following figures and accompanying detailed description.

SUMMARY OF THE INVENTION

The present invention is embodied in a system and method for the fusion of physiological sensor measurements from a subject. A plurality of sensors are coupled to the subject, with each of the sensors capable of producing a signal related to a physiological parameter. A statistical model affecting the fusion of the sensor measurements is used by a statistical filter circuit. The statistical filter circuit receives the statistical model and the physiological signals and produces a parameter estimate for each possible combination of the sensor measurements wherein each of the sensor measurements can be considered to be acceptable or unacceptable in producing the parameter estimates for each possible combination of the sensor measurements. A confidence calculator coupled to the filter circuit receives the parameter estimates and determines a confidence level value for each of the parameter estimates. The confidence level is indicative of the accuracy of each of the parameter estimates and the confidence calculator selects the parameter estimate based on the confidence level.

The statistical filter can also receive a previous estimate of the physiological parameter selected by the confidence calculator. In this embodiment the statistical filter produces the parameter estimates based on the measurement from the physiological signals, the statistical model, and the past estimate. In one embodiment, the statistical model is a parameter variability statistical model that characterizes changes in the parameter over time. The statistical model may also be an error model characterizing the susceptibility of the sensor measurements to nominal error. Alternatively, the system may include two models, with the first model characterizing the sensor error and the additional model characterizing the parameter variability. The statistical filter uses the model or models to determine the parameter estimates for each of the possible sensor measurement combinations. In one embodiment, the system assumes a Gaussian probability density function for the statistic model.

The system is also adaptive in that the statistical model can be updated following the selection of a parameter estimate by the confidence calculator. The statistical filter circuit may be a Kalman filter for each of the possible sensor combinations wherein the Kalman filters use the previous parameter estimate and the statistical model to produce the parameter estimates.

The system is also susceptible to artifact interference that causes a particular sensor measurement to be considered unacceptable. The confidence calculator analyzes the parameter estimates generated by the statistical filter circuit and determines a statistical probability of error of each of the parameter estimates caused by the artifactual measurement. Thus, the system can generate a fused estimate for sensors contaminated by a nominal error, as characterized by the statistical model, as well as sensor combinations in which a sensor is affected by artifact. The system may also combine the sensor error statistical model and the statistical probability of contamination by artifact to determine a parameter estimate. In one sensor combination, all sensor measurements are contaminated by artifact and considered to be unacceptable. The system calculates a minimum confidence level for this sensor combination and further selects the parameter estimate the highest probability of contamination by artifact while simultaneously having a minimum probability of the confidence level exceeding the calculated minimum confidence level.

DETAILED DESCRIPTION OF THE INVENTION

Figure 1:
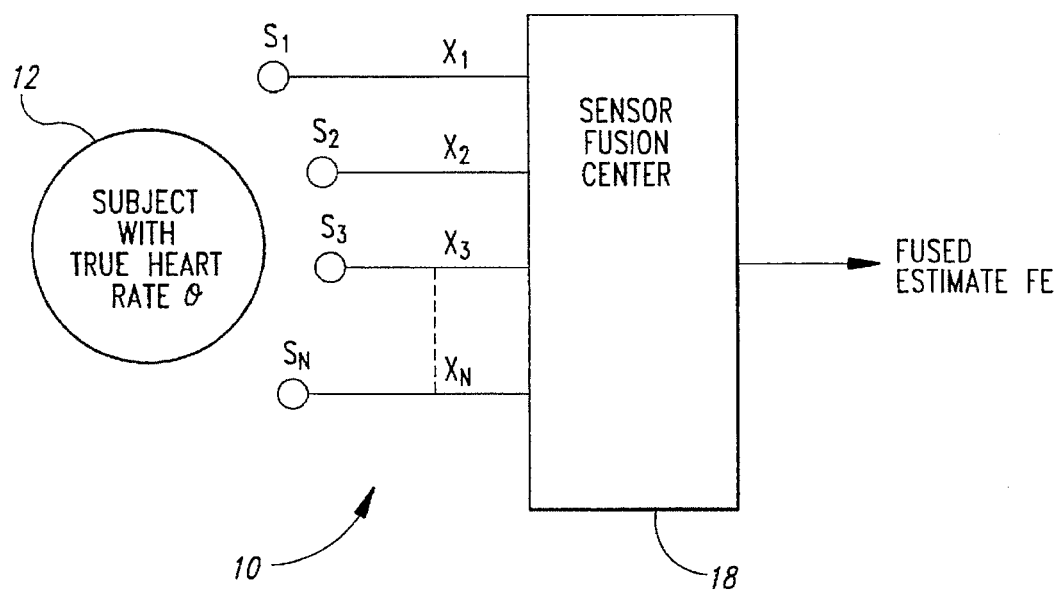
FIG. 1 is a functional block diagram of the system of the present invention.

A typical patient, for whom a particular physiological measurement is desired, may be monitored with more than one sensor from which the physiological measurement can be derived. The present invention provides a technique for combining the observations from the multiple sensors in order to obtain a more accurate measurement than would be available from an individual sensor. The process of combining the observations from sensors is defined herein as "sensor fusion." Although the specific examples presented herein are directed to heart rate estimation, those skilled in the art will readily recognize that the principles of the present invention are applicable to other physiologic parameters as well. For example, respiratory measurements can be provided by a variety of different sensors. Sensor fusion of the present invention can be applied to the multiple sensors to generate a fused respiratory measurement.

The essence of sensor fusion is to utilize redundant measurements from multiple sensors to find the best estimate of heart rate at any point in time. Sensor fusion has been used in other areas of technology, most notably robotics and radar tracking. However, sensor fusion applications in robotics and radar tracking rely upon a large number of sensors and the best estimate is derived by looking for the largest number of sensors that agree within a defined range of acceptable variation, a so-called consensus method of fusion.

The problem of applying sensor fusion to physiologic data in the clinical environment is unique from the other domains for two reasons. First, there are fewer sensors available for physiologic data. Sensor fusion applied to physiological measurement in the clinical environment will typically be based upon three, and sometimes two, sensors. As a result, for any given point in time, one or even zero sensors will be estimating the heart rate correctly. Therefore, the solution must be designed to distinguish those situations where useful information is available from one or more sensors or when no useful information is available. Second, the sensors in robotics and radar tracking tend to be susceptible to the same type of error. In contrast, the noise that can interfere with the physiologic sensor signals may be frequent or infrequent, of small or large magnitude and is always unpredictable. In addition, different physiological sensors are affected by different types of noise sources. Thus, the known sensor fusion techniques of robotics and radar tracking are not effective for physiological sensor fusion.

Since there are only a few sensors used in physiologic measurement, and any or all of the sensors may be incorrect at any time, consensus alone is not sufficient to reliably find the best estimate of heart rate. The present invention determines a confidence level for every fused estimate. Whereas other methods of sensor fusion base the confidence level only on consensus between the measurements of the large number of sensors, the present invention determines the confidence level based upon several factors, such as consensus between sensors, the likelihood that a measurement is physiologically consistent, and an understanding of the types of sensor error that can occur. In addition, the present invention goes to great lengths to detect artifact in the various sensor measurements.

The present invention is also adaptive in that the results of the estimation process are used to refine the models which determine physiologic consistency and acceptability of sensor error. The inability to completely characterize the error leads to another unique aspect of the present invention. Worst case conditions are always assumed when considering the possible error. For this reason, the present invention is considered "robust." The term "robust," as used herein refers to signal processing systems that take statistical unknowns or uncertainties into account and provide good system performance even in the face of these unknowns.

The advantage of using multiple sensors is that the redundancy and diversity of sensors provides: (1) a greater likelihood of having at least one source of correct information at all times; and (2) a means to decide upon the acceptability of a particular estimate based upon the interrelationship between the sensor measurement. The greater likelihood of having at least one source of correct information at all times (advantage 1 above) is apparent when one considers that, if one sensor tends to be affected by a particular source of artifact, then using another sensor which is not affected in this way will improve the chances of having at least one accurate source and thus increases the probability of generating a correct estimate of the physiological measurement.

These principles can be extended to a situation where there are many sensors of diverse types, which provides the added advantage of determining the interrelationship between the various sensor measurements (advantage 2 above) as a means of deciding which measurements are accurate and which measurements are affected by artifact, since the likelihood of all or most of the sensors being simultaneously affected by some artifact is lower.

The redundancy of multiple sensors aids in this respect since it allows the system to reject an observation based on even a small possibility of artifact occurrence, since a more reliable alternative source will generally be available.

The present invention is embodied in a system 10 illustrated in FIG. 1 wherein a subject 12 has a true heart rate, designated herein as $\theta$. A plurality of sensors, designated $S_1$-$S_N$, are coupled to the subject 12. Each sensor $S_1$-$S_N$ produces a different sensor measurement $X_1$-$X_N$, respectively, of the heart rate. A sensor fusion center (SFC) 18 analyzes each of the sensor measurements $X_1$-$X_N$ to derive a fused estimate FE of the heart rate. As will be described in detail below, the SFC 18 analyzes each oft he sensor measurements $X_1$-$X_N$ using a priori knowledge of the sensors $S_1$-$S_N$, as well as other statistical measures to derive the fused estimate FE.

Figure 2:
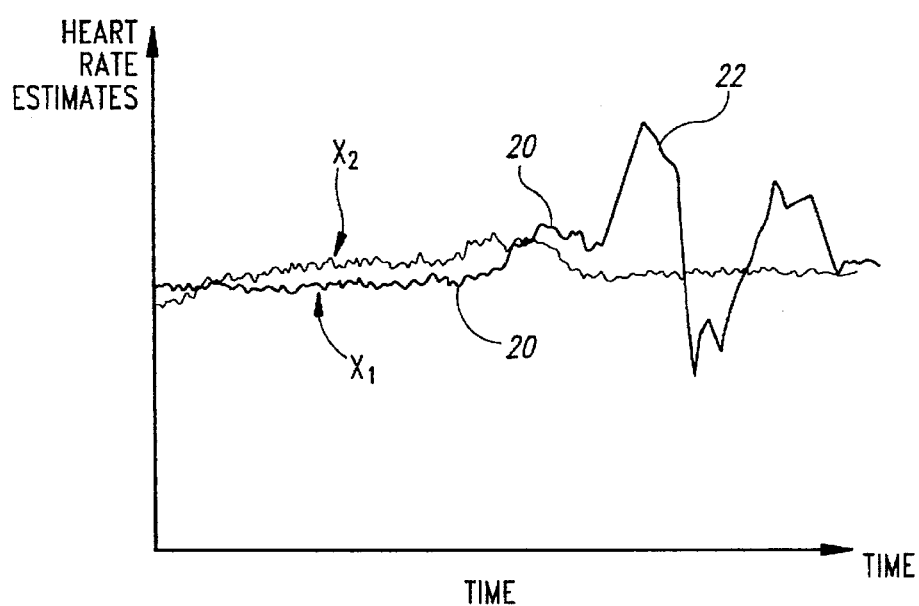
FIG. 2 illustrates possible types of error contaminating the observations of the system of FIG. 1.

It should be noted that the sensors $S_1$-$S_N$ are not necessarily of the same type and may, in fact, measure different quantities. Because the sensors $S_1$-$S_N$ are contaminated by various types and extents of noise, they each provide sensor measurements that have an error. For example, the sensor measurements $X_1$-$X_2$, illustrated in FIG. 2, are subject to nominal error contamination 20 as well as artifactual error contamination 22. Those of ordinary skill in the art understand that noise is present in virtually all physiologic signals. If the noise present on the sensors $S_1$-$S_N$ is relatively low level, the sensor observations $X_1$-$X_N$ may contain only the nominal error contamination 20, while large mounts of noise on the sensors can result in the artifactual error contamination 22 in the sensor observations. The present invention is directed to the analysis of the error in the sensor observations $X_1$-$X_N$ that results from the noise rather than any analysis of the noise itself.

It should be noted that, even when a sensor measurement is designated as "good," there may be some error due to the nominal error contamination 20. This is characterized by the equation (1) below:

$$X_i = \theta + er_i \tag{1}$$

where $X_i$ is the sensor measurement from sensor i, $\theta$ is the true value of the parameter, and $er_i$ is the error from sensor i. The goal is to derive the fused estimate FE using the sensor measurements $X_1$-$X_N$, so that the error is within acceptable limits. This goal may be characterized by equation (2) below:

$$|FE - \theta| \leq e \tag{2}$$

where FE is the fused estimate, $\theta$ is the true value of the parameter, and e is the maximum acceptable error.

It is assumed that the nominal error contamination 20 is more prevalent in the sensor measurements $X_1$-$X_N$ than artifactual error contamination 22. It is further assumed that the nominal error contamination 20 is smaller than the maximum acceptable error e in equation (2) above. To ensure that these assumptions are valid, the value for the maximum acceptable error e, which may be user defined, should define a range that exceeds the acceptable nominal error contamination 20. The nominal error contamination 20 arises from the cumulative effects of many different minor activities that derive from the subject 12, the subject-sensor interface, and signal processing errors. Therefore, a mathematical principle known as the Central Limit Theorem justifies the characterization of the nominal error contamination 20 by a fixed "white" Gaussian model or probability density function (PDF).

In contrast, the artifactual error contamination 22 is expected to provide a sporadic, but significant, impact on the sensor measurements $X_1$-$X_N$. The artifactual error contamination 22 is more difficult to characterize statistically. Observations of heart rate data can be used to indicate if the assumptions that nominal error contamination 20 is more prevalent, but smaller than the maximum acceptable error, are valid. In addition, the maximum acceptable error, e, is used to define the sensor error as either nominal error contamination 20 or artifactual error contamination 22 using the following equations (3) below:

$$|er_i| \leq e \rightarrow \text{"good" observation}$$
$$|er_i| > e \rightarrow \text{"bad" observation} \tag{3}$$

where $er_i$ is the error from sensor i and e is the maximum acceptable error. In equations (3) above, good observations are assumed to have only the nominal error contamination 20 while the bad observations are assumed to contain artifactual error contamination 22.

The SFC 18 utilizes the sensor measurements $X_1$-$X_N$ to provide a better estimate of heart rate than could be achieved by prior art systems that rely on an individual sensor. Since each of the sensors $S_1$-$S_N$ relies upon independent measurements to determine heart rate, very often one or more sensors will be unaffected by the interference that influences another sensor's signal. The goal of sensor fusion is to distinguish those sensors which are afflicted with artifact from those which are not, and to produce a better estimate of heart rate by combining readings from non-afflicted sensors than is available from any single sensor.

There is an expected difference in the normal heart rate between subjects and for the same subject at different times. The SFC 18 uses past observations of heart rate to determine whether current sensor measurements $X_1$-$X_N$ are acceptable from a physiological perspective, because of the existence of finite limits on rate of change (i.e., velocity) as well as the rate of rate of change (i.e., acceleration), or even higher order differentials. The SFC 18 statistically characterizes this variability and utilizes this statistical knowledge of past observations to determine whether a current set of sensor measurements $X_1$-$X_N$ are physiologically consistent. The SFC 18 uses the statistical data for heart rate variability in the particular subject to establish a model for heart rate variability for the particular subject. The heart rate variability model can be used to determine whether the sensor measurements $X_1$-$X_N$ are consistent. It should also be noted that the characteristics of heart rate vary from person to person. Any sensor measurements $X_1$-$X_N$ that deviate from an expected "norm" based on these characteristics can provide an indication of the occurrence of artifact or a significant change in the physiological dynamics of the subject, or both. The SFC 18 utilizes a model of heart rate that incorporates specific information about the subject. As additional data is gathered from the individual subject, the statistical model of heart rate variability is refined to better represent the characteristics of the particular subject.

Another basis on which to evaluate the credibility of sensor measurements $X_1$-$X_N$ involves knowledge about the characteristics of artifactual error contamination 22 (see FIG. 2) which are endemic to the different types of sensors. For example, some sensors are more susceptible to certain types of physical movement, while others are affected by electrical interference such as an electrocautery machine. Thus, some types of errors are more prevalent during the occurrence of particular events, such as physical movement, or being subjected to electrosurgery. Furthermore, some types of errors tend to occur intermittently, while others can persist indefinitely. Even acceptable measurements are subject to some error, and knowledge of this type and extent of error, as well as the context of its occurrence, is useful in determining overall estimate of heart rate from a set of acceptable readings. However, it is impossible to categorize or model every possible source, or combination of sources of artifact. At best, it is possible to model the sources of error which are acceptable and which sources of error tend to be common so that the occurrence of an unusual measurement will be detected based on its being unlikely to belong to the model of acceptable errors.

Figure 3:
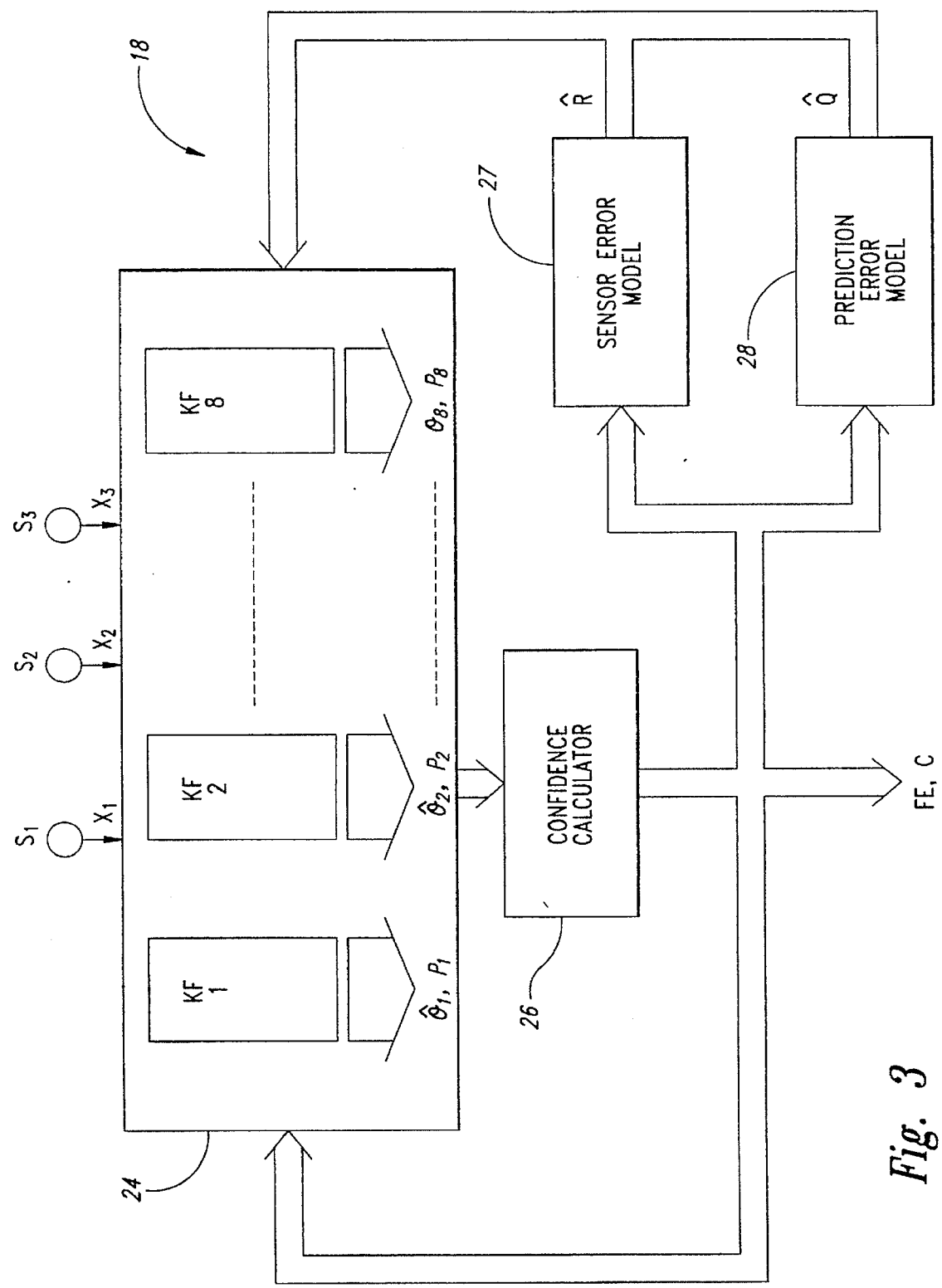
FIGS. 3 is a more detailed functional block diagram of the system of FIG. 1.

As illustrated in the functional block diagram of FIG. 3, the SFC 18 includes a Kalman filter circuit 24 that provides a Kalman filter $KF_1$-$KF_N$ for each of the possible combination of sensor measurements $X_1$-$X_N$. Kalman filters are statistical filters that are well known in the art and need only be discussed briefly herein. However, numerous textbooks, such as *Tracking and Data Association*, by Y. Bar-Shalom and R. E. Fortmann, Academic Press, Boston, 1988, provide details on the theory and operation of Kalman filters and statistical signal processing and optimal estimation. The Kalman filter circuit 24 includes individual Kalman filters $KF_1$-$KF_8$ that are each supplied with the past fused estimate FE, as well as statistical data related to sensor error and variability of the parameter itself. It should be noted that the example of FIG. 3 includes eight Kalman filters $KF_1$-$KF_8$ because eight combinations of good or bad sensors are available from the three sensor measurements $X_1$-$X_3$. However, the number of Kalman filters depends on the number of sensor measurements. With four sensors, a total of sixteen Kalman filters are required.

In the example illustrated in FIG. 3, three sensors $S_1$-$S_3$ produce sensor measurements $X_1$-$X_3$ that are either good or bad, depending on whether or not the particular observation was corrupted by artifactual error contamination 22 (see FIG. 2). With three sensors, there are 8 (i.e., $2^3$) possible combinations of observations since each sensor measurement $X_1$-$X_3$ may be providing either good or bad data. This is illustrated in Table 1 below:

|  | Sensor Combination | | | | | | | |
| --- | --- | --- | --- | --- | --- | --- | --- | --- |
|  | #1 | #2 | #3 | #4 | #5 | #6 | #7 | #8 |
| $X_1$ | G | G | G | G | B | B | B | B |
| $X_2$ | G | G | B | B | G | G | B | B |
| $X_3$ | G | B | G | B | G | B | G | B |
| FE | G/B | G/B | G/B | G/B | G/B | G/B | G/B | G/B |
| True HR | θ | θ | θ | θ | θ | θ | θ | N/A | where a good sensor measurement is designated by a "G" and a bad sensor measurement is designated by a "B." Thus, the overall fused estimate FE is either good or bad depending on the validity of the individual sensor measurements. As discussed above, even a good sensor measurement may contain nominal error contamination 20 (see FIG. 2).

In the above example with three sensors $S_1$-$S_3$, the Kalman filter circuit 24 includes Kalman filters $KF_1$-$KF_8$, corresponding to each of the eight possible combinations of sensor measurements $X_1$-$X_3$. Thus, Kalman filter $KF_1$ corresponds to sensor combination 1 from Table 1 above, while Kalman filter $KF_8$ corresponds to sensor combination 8. The Kalman filters $KF_1$-$KF_8$ produce interim fused estimates, designated herein as $\hat{\theta}_1$-$\hat{\theta}_8$, respectively. Each possible sensor combination is known in the field of statistics as a "hypothesis." It is not known which of the hypotheses is the best estimate of the heart rate because it is not known which of the sensors combinations contain data that has been affected by the artifactual error contamination 22.

It should be noted that the Kalman filters $KF_1$-$KF_8$ produce fused estimates for each hypothesis using only sensor measurements that are assumed to be good for that particular hypothesis. For example, the Kalman filter $KF_2$ (sensor combination #2 in Table 1) only uses the sensor observations $X_1$ and $X_2$, while the Kalman filter $KF_3$ (sensor combination #3 in Table 1) only uses the sensor observations $X_1$ and $X_3$. Thus, each fused estimate produced by the Kalman filters $KF_1$-$KF_8$ is based solely on the sensor observations that are assumed to be good.

Each hypothesis is analyzed by a confidence calculator 26 to determine a confidence level for each hypothesis. As will be discussed in detail below, the confidence level is a measure of the probability of an accurate estimate given the likelihood of contamination by the nominal error contamination 20 (see FIG. 2), the likelihood of contamination by the artifactual error contamination 22, as well as the likelihood of variation in the physiological parameter itself. The confidence calculator 26 selects the hypothesis with the highest confidence level as the fused estimate FE.

The confidence calculator 26 uses the fused estimate FE and determines an associated confidence level C for each fused estimate. The fused estimate with the higher confidence value is selected as the optimal estimate. These parameters are used to modify a sensor error model 27 and a prediction error model 28. The sensor error model 27 is used to statistically characterize the nominal error contamination 20 on the sensor measurements $X_1$-$X_3$. The prediction error model 28 is used to statistically characterize the variability of the physiological parameter itself. In the present example, the prediction error model 28 statistically characterizes the heart rate variability. The sensor error model 27 and the prediction error model 28 are updated by the output of the confidence calculator 26 and are used by the Kalman filter circuit 24 for the next set of measurements. Thus, the system 10 is adaptive because the current results modify the sensor error model 27 and the prediction error model 28.

Figure 4:
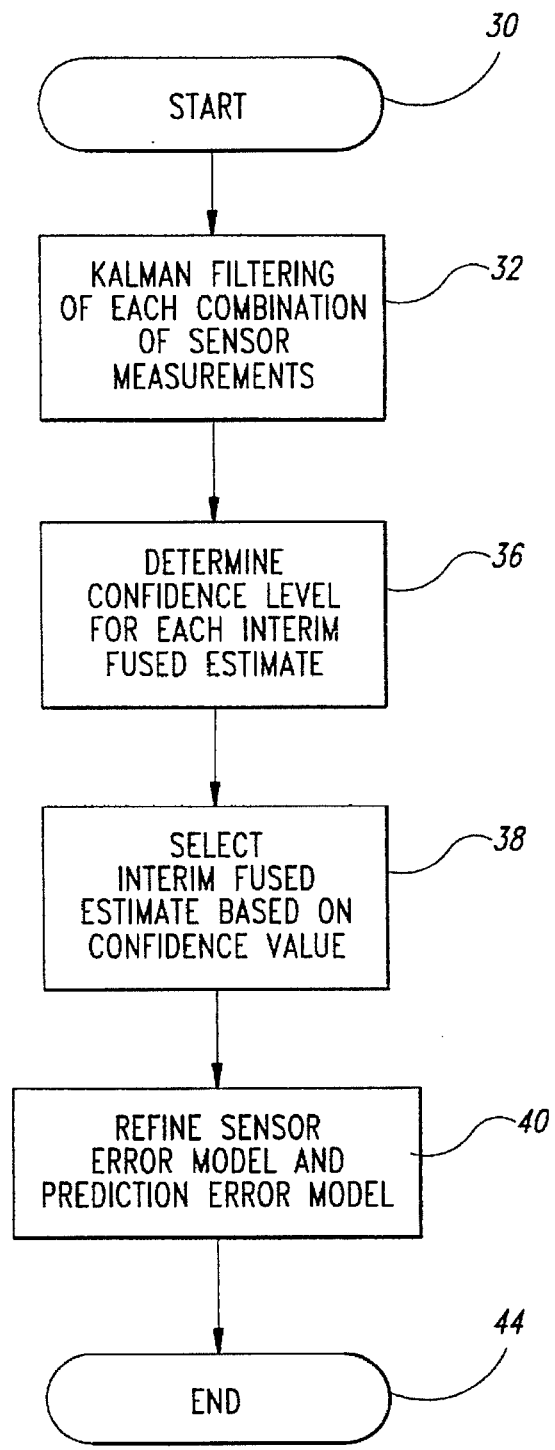
FIG. 4 is a flow chart used by the system of FIG. 3 to analyze physiological data.

The system 10 uses a three stage process, illustrated in the flow chart of FIG. 4, to arrive at the best estimate of heart rate at any point in time. At the start 30, the sensors $S_1$-$S_N$ have provided sensor measurements $X_1$-$X_N$, respectively, to the SFC 18 (see FIG. 3). In step 32, the SFC 18 applies Kalman filtering to each of the possible combinations of sensor measurements $X_1$-$X_N$ to determine the statistical probability of a valid reading from each of the combinations of sensor measurements. Thus, the Kalman filtering process produces the interim fused estimate IFE for each possible combination of sensor measurements $X_1$-$X_N$.

In step 36 the SFC 18 determines the confidence level for each interim fused estimate. The confidence level is determined using Huber's theorem, which will be described in greater detail below. In step 38, the SFC 18 selects one interim fused estimate as the fused estimate FE based on the confidence levels. The system 10 can select the interim fused estimate with the highest confidence value. However, as will be described in detail below, the confidence calculator 26 (see FIG. 3) selects the interim fused estimate with the highest probability of providing an accurate estimate in light of the probability of contamination by artifactual error contamination 22 (see FIG. 2).

In step 40, the SFC 18 refines the sensor error model 27 and the prediction error model 28 to include the data from the current measurement. This adaptive aspect of the system 10 will be described in greater detail below. The system 10 ends at step 44 with the interim fused estimate IFE with the highest confidence level having been selected as the fused estimate FE and models updated to reflect the most current data. Thus, the system 10 can derive an accurate measure of the physiological parameter from the various sensor measurements $X_1$-$X_N$ even in the presence of artifactual error contamination 22 (see FIG. 2).

The various stages of processing by the SFC 18 will now be described in detail. Returning to FIG. 3, stage one of the analysis, which corresponds to step 32 (see FIG. 4), involves the Kalman filters $KF_1$-$KF_8$, which utilize the statistical characteristics of sensor data to derive the optimal heart rate estimate for every possible combination of sensor states, which is either artifactual or non-artifactual. Statistical characteristics are essentially a statistical description of the expected physiologic changes in heart rate that can be measured by the sensor as well as a statistical description of the types of error that can corrupt the measurement.

Each of the Kalman filters $KF_1$-$KF_8$ produces an interim fused heart rate estimate $\hat{\theta}_1$-$\hat{\theta}_8$, respectively and a value $P_1$-$P_8$, respectively, which are the error covariance extrapolation values. These values are based on the past fused heart rate estimate, designated herein as $\hat{\theta}^-$, and the statistical characterizations of the sensor error model 27 and the prediction error model 28. The values $\hat{\theta}_1$-$\hat{\theta}_8$ represent the interim fused estimate for each of the eight hypotheses, respectively. The values $P_1$-$P_8$, designated as error covariance extrapolation values, are conventional values generated by Kalman filters to estimate the error that results from using the past fused estimate $\hat{\theta}^-$ to generate the current estimates $\hat{\theta}_1$-$\hat{\theta}_8$. That is, the Kalman filters $KF_1$-$KF_8$ have some error that is attributable to the fact that the present estimate is based in part on a past estimate of the parameter rather than an exact value of the parameter. Those familiar with Kalman filtering will understand that the values $P_1$-$P_8$ should not be confused with error covariance that is generated after incorporating the current sensor measurements $X_1$-$X_8$. The error covariance corresponding to the chosen hypothesis is then used to generate the error covariance extrapolation values $P_1$-$P_8$ for the next set of measurements.

The error resulting from the use of the past fused estimate $\hat{\theta}^-$ in the Kalman filter circuit 24 to generate the current estimates $\hat{\theta}_1$-$\hat{\theta}_8$ are well known to those of ordinary skill in the art of statistical analysis and signal processing and need not be explained in greater detail herein. As will be described in greater detail below, the values $P_1$-$P_8$ are used by the confidence calculator 26 to determine the confidence level for each hypothesis.

The values $P_1$-$P_8$ are set to a large value when the system 10 is initialized to reflect the fact that them is no past fused estimate $\hat{\theta}^-$. As past estimates become available, the values of $P_1$-$P_8$ become smaller to reflect the fact that the present interim fused estimates $\hat{\theta}_1$-$\hat{\theta}_8$ are estimated more reliably as the system 10 adapts to the individual subject. As previously discussed, the system 10 dynamically adapts to the specific individual as more measurements are performed.

As discussed above, the current interim fused estimates $\hat{\theta}_1$-$\hat{\theta}_8$ by the Kalman filters $KF_1$-$KF_8$ are based in part on the past fused estimate $\hat{\theta}^-$. Those familiar with Kalman filtering will understand that more than one past estimate can be used to derive a past estimate value. For example, an average value for a number of past estimates could be used. However, in its presently preferred embodiment, the system 10 uses only the immediate past fused estimate $\hat{\theta}^-$ as an input to the Kalman filters $KF_1$-$KF_8$.

The Kalman filter provides an optimal estimate if a Gaussian distribution PDF characterizes the nominal error contamination 20 (see FIG. 2), as previously discussed. The Gaussian PDF for the nominal error contamination 20, represented by the sensor error model 27, is completely characterized by the sensor measurements $X_1$-$X_8$ and $\hat{R}$, which is a correlation matrix whose elements are nominal sensor error variances and cross-covariances. In the present embodiment of the system 10, the values of the cross-covariances are set to zero based on the assumption that the errors are independent. However, as those skilled in the art can appreciate, it is possible to determine values of the cross-covariances. The characterization of the Gaussian distribution PDF of the nominal error contamination 20 using the matrix $\hat{R}$ is well known in the field of statistical signal processing and need not be discussed in greater detail herein.

In addition, the system 10 assumes that nominal changes in heart rate can also be represented by a Gaussian PDF. The Gaussian PDF for the heart rate variability, represented by the prediction error model 28, is also assumed to be completely characterized by the past fused estimate $\hat{\theta}^-$ and a value $\hat{Q}$, which is a variability correlation estimate that describes the nature of the Gaussian distribution for the nominal changes in heart rate. The characterization of the Gaussian distribution PDF of the heart rate variability using the value $\hat{Q}$ is well known in the field of statistical signal processing and need not be discussed in greater detail herein. For example, the use of Kalman filters and the estimators $\hat{R}$, $P$, and $\hat{Q}$ are discussed in *Applied Optimal Estimation* edited by Arthur Gelb, M. I. T. Press, Cambridge, Mass., 1974.

The Kalman filters $KF_1$-$KF_8$ are each first-order Kalman filters using the sensor measurements $X_1$-$X_3$, the past fused estimate $\hat{\theta}^-$ for heart rate, and the correlations $\hat{R}$ and $\hat{Q}$. The system 10 initially assumes worst case values for $\hat{R}$ and $\hat{Q}$. As will be described below, the estimates for $\hat{R}$ and $\hat{Q}$ are dynamically updated as the system 10 continues to make measurements. The dynamic updating makes the system 10 adaptive. Thus, the Kalman filters $KF_1$-$KF_8$ produce eight interim fused estimates $\hat{\theta}_1$-$\hat{\theta}_8$ of heart rate using the statistical knowledge of error and changes in heart rate. The best estimate, and its corresponding confidence level are determined in the next stage of analysis.

As previously discussed, the Central Limit Theorem justifies the nominal error contamination to be characterized as a Gaussian distribution. However, the artifactual error contamination 22 (see FIG. 2) can have any statistical distribution of error. Therefore, to maximize accuracy, the system 10 does not make any a priori assumptions about the PDF of the artifactual error contamination 22. While the Kalman filter circuit 24 can use the Gaussian PDFs for the nominal error contamination 20 (see FIG. 2) and the heart rate variability, it does not take into account any probability of artifactual error. This probability is taken into account by the confidence calculator 26.

Stage two of the analysis, which corresponds to steps 36 and 38 of FIG. 4, uses Huber's theorem for posterior robustness to find a confidence level for each interim fused estimate $\hat{\theta}_1$-$\hat{\theta}_8$ obtained from the Kalman filters $KF_1$-$KF_8$. Huber's theorem for posterior robustness is well known and need not be discussed in detail herein. The fundamentals of Huber's theorem are discussed in *Statistical Decision Theory and Bayesian Analysis*, Berger, J. O., Springer Verlag, Second Edition, 1985. The application of Huber's theorem to statistical signal processing for sensor fusion of physiologic signals will be discussed in detail below. The calculated confidence level ranges in value from 0.0 to 1.0 and expresses the likelihood that the associated interim fused estimate is correct. This is expressed mathematically by equations (4) below:

$$C_i(|\hat{\theta}_i - \theta| \leq e) \rightarrow 1.0 \text{ (complete confidence)}$$

$$C_i(|\hat{\theta}_i - \theta| \leq e) \rightarrow 0.0 \text{ (no confidence)} \qquad (4)$$

where $C_i$ is the confidence level for the ith interim fused estimate IFE and $\hat{\theta}_i$ is the ith interim fused estimate. A confidence level approaching 1.0 for a particular interim fused estimate represents virtual certainty that the particular interim fused estimate is correct, while a confidence level approaching 0.0 is the lowest possible confidence.

The confidence level is determined by the confidence calculator 26 based on several factors. The physiologic credibility of the estimate is the first factor. Physiologic credibility is used to evaluate the interim fused estimate $\hat{\theta}_1$-$\hat{\theta}_8$ relative to the known limits of heart rate, both absolute heart rate limits and limits on the rate of change of the heart rate. Consistency of the interim fused estimates $\hat{\theta}_1$-$\hat{\theta}_8$ with the parameter variability model 28 is a second factor used by the confidence calculator 26 to determine the confidence level. Consensus between the sensors $S_1$-$S_3$ is a third factor used to determine the confidence level. The confidence level is increased when more than one sensor is in agreement. Statistical descriptions of sensor error are then evaluated and worst case assumptions about artifactual error characteristics are used to derive the confidence level. The selection of the interim fused estimate IFE with the highest likelihood of being correct is illustrated by equation (5) below:

$$\max_{hyp} P(|\hat{\theta}_{hyp} - \theta| \leq e/X_{hyp}, \hat{\theta}^-) = P(|\hat{\theta}_{hyp^*} - \theta| \leq e/X_{hyp^*}, \hat{\theta}^-) \quad (5)$$

where "hyp" refers to each of the hypotheses corresponding to the combinations of sensor measurements $X_1$-$X_3$, $P()$ is the probability of a particular hypothesis providing an estimate within the acceptable limits of error given $X_{hyp}$ and $\hat{\theta}^-$, $X_{hyp}$ is a representation of the sensor measurements $X_1$-$X_3$ that have been designated as good (see Table 1) for each hypothesis, $\hat{\theta}$ is the current estimate, $\theta_{hyp^*}$ is the estimate corresponding to the maximum search, $\hat{\theta}^-$ is the previous fused estimate, and $\hat{\theta}_{hyp}$ is the interim fused estimate for each hypothesis generated by the Kalman filter circuit 24.

Equation (5) indicates the selection of the maximum probability that a particular fused estimate is within the acceptable error bounds, given the sensor values and the past fused estimate.

The calculation of this probability can be done by direct application of the classical statistical relationship, Bayes Theorem, which is well known, and will not be discussed in detail herein. Bayes Theorem and its application and statistics are discussed in statistical decision and Bayesian Analysis, as well as *Introduction to the Theory of Statistics* by Mood et at., McGraw Hill, 3d ed., 1985. As those skilled in the art will appreciate, equation (6) below is a derivation for the application of Bayes Theorem to the estimation of a parameter. Such a derivation is discussed in *Statistical Decision Theory and Bayesian Analysis* (page 83). Therefore, the derivation of equation (6) is not discussed herein. In the derivation of equation (6), it is assumed that the physiological parameter of interest (e.g., heart rate) has a range of possible values such that it cannot exist outside this range. It is also assumed that the physiological parameter of interest can be any value, with equal probability, within that range. The probability that a particular hypothesis is correct is given by equation (6) below:

$$P(|\hat{\theta}_{hyp} - \theta| \leq e/X_{hyp}, \hat{\theta}^-) = \frac{P(X_{hyp}, \hat{\theta}^-, |\hat{\theta}_{hyp} - \theta| \leq e)}{P(X_{hyp}, \hat{\theta}^-)} = \frac{\int_{|\hat{\theta}_{hyp} - \xi| \leq e: \xi \leq \theta_{max}, \xi \geq \theta_{min}} f(X_{hyp} - \xi) g(\hat{\theta}^- - \xi) d\xi}{\int_{\theta_{min}}^{\theta_{max}} f(X_{hyp} - \xi) g(\hat{\theta}^- - \xi) d\xi} \quad (6)$$

where f is a PDF for the sensor error given by the sensor error model 27 (see FIG. 3), g is a PDF that characterizes the prediction error, $X_{hyp}$ is a representation of sensor values designated as good for a particular hypothesis, $\hat{\theta}^-$ is the previous fused estimate of the physiological parameter of interest, $\theta_{min}$ is the minimum possible value of the parameter, and $\theta_{max}$ is the maximum possible value of the parameter. It should be noted that the f PDF is only partially characterized by the sensor error model 27 since the sensor error model only characterizes the nominal error contamination 20 (see FIG. 2). As will be discussed in detail below, the complete characterization of the f PDF requires the consideration of the artifactual error contamination 22 (see FIG. 2). As previously discussed, the values $P_1$-$P_8$ generated by the Kalman filters $KF_1$-$KF_8$, respectively, are taken into account by the confidence calculator 26. The values $P_1$-$P_8$ are the variances of the g PDF in equation (6) above and characterize the prediction error that results from the use of past estimates rather than exact values of the physiologic parameter.

Equation (6) can be more readily understood if one appreciates the behavior of the product of the f PDF and the g PDF with respect to how closely the sensor values and the past fused estimate $\hat{\theta}^-$ agree. The less the sensor measurements $X_1$-$X_N$ and the past estimate $\hat{\theta}^-$ are in agreement, the smaller the size of the product of $f()$ and $g()$ at the Kalman estimate, and the resultant product will have a broad peak that declines more slowly with respect to other possible values in its neighborhood. The numerator in the ratio in equation (6) sums up the value of this product in the immediate neighborhood of the Kalman estimate, whereas the denominator in equation (6) sums up the value of the product over the entire credible range of the parameter. If the sensor measurements $X_1$-$X_N$ and past fused estimate $\hat{\theta}^-$ are not in agreement, the summation in the immediate neighborhood of the Kalman estimate will be small in comparison to the summation over the entire range because the product will be more widely spread. On the other hand, if the sensor measurements $X_1$-$X_N$ are in close agreement with each other and the past fused estimate $\hat{\theta}^-$, the product of the f PDF and the g PDF will have a very narrow spread, and the summation of values in the immediate neighborhood will be nearly the same as that over the entire credible range. Therefore the ratio of the numerator to denominator, and the probability $P()$ will approach unity.

In order to implement equation (6), the f PDF given by the sensor error model 27 (see FIG. 3) and the g PDF given by the prediction error model 28 are required. Recall that the Kalman Filter only uses the prediction error model 28, characterized by past fused estimate $\hat{\theta}^-$ and the value $\hat{Q}$, and the sensor error model 27 for nominal error contamination 20 (see FIG. 2), characterized by matrix $\hat{R}$. The prediction error model 28 is available, but the sensor error model 27 is incompletely specified, since the artifactual error model to characterize artifactual error contamination 22 (see FIG. 2) is not known. The nominal and the artifactual error models are related through an "epsilon class contamination" model, which is given by equation (7) below:

$$f(X_{hyp}-\theta) = (1-\epsilon_{hyp})\hat{f}(X_{hyp}-\theta) + \epsilon_{hyp} f'(X_{hyp}-\theta) \quad (7)$$

where $\epsilon_{hyp}$ is the probability of artifact, $X_{hyp}$ is a representation of each of the sensor measurements designated as good (see Table 1) for a particular hypothesis, $\hat{f}()$ represents a good sensor error model, and $f'()$ represents artifactual sensor error model.

The fundamental concepts of the epsilon class contamination are known in the art and will not be discussed in detail herein. Such models are discussed, for example, in *Statistical Decision Theory and Bayesian Analysis*. The specific form of equation (7) is given on page 98 of that reference. To conceptually grasp how equation (7) functions, assume that the error contamination will either be the nominal error contamination 20 (see FIG. 2), which is characterized by the Gaussian PDF, or the artifactual error contamination 22, which has an unknown PDF. The system 10 assumes that the selection process is biased in favor of the nominal error contamination 20 by a probability $(1-\epsilon_{hyp})$. Thus, the true error model is the composite of the Gaussian PDF for the nominal error contamination 20 and the unknown model error for the artifactual error contamination 22. The composite of these two models is termed a "heavy-tailed" PDF, and has been widely applied in the field of robust statistics.

By making worst case assumptions about the nature of the artifactual model, the resulting probability value yields a robust choice of the correct hypothesis. The design is robust because it accounts for the unknown artifactual model by assuming worst case possibilities and yet also produces feasible performance. This is illustrated by equation (8) below:

$$\max_{hyp} \inf_{f} P(|\hat{\theta}_{hyp} - \theta| \leq e/X_{hyp}, \hat{\theta}^-) = P(|\hat{\theta}_{hyp}{}^* - \theta| \leq e/X_{hyp}{}^*, \hat{\theta}^-) \quad (8)$$

The similarity of equation (8) to equation (5) should be noted. The only difference is the assumption of worst-case artifactual error type which yields the minimum probability of achieving an estimate within the tolerance. So the selection process now consists of picking the most likely (maximum probability hypothesis) from among the minimum probabilities.

The implementation of equation (8) can be carried out by applying the epsilon class contamination model of equation (7) to the implementation of the Bayes Formula in equation (6), and assuming worst case characteristics for the unknown error model. Details of the derivation can be found in *Statistical Decision Theory and Bayesian Analysis*, page 211, and are thus omitted here. The worst case analysis was first carried out by Peter Huber and is thus known as Huber's theorem. The application of Huber's theorem by the system 10 is given by equation (9) below:

$$\inf_{f} P(|\hat{\theta}_{hyp} - \theta| \leq e/X_{hyp}, \hat{\theta}^-) = \quad (9)$$

$$\frac{(1 - \epsilon_{hyp}) \int_{|\hat{\theta}_{hyp} - \xi| \leq e} \hat{f}(X_{hyp} - \xi) g(\hat{\theta}^- - \xi) d\xi}{(1 - \epsilon_{hyp}) \int_{-\infty}^{+\infty} \hat{f}(X_{hyp} - \xi) g(\hat{\theta}^- - \xi) d\xi + \epsilon_{hyp} * y_{hyp}* \left(1 - \int_{|\hat{\theta}_{hyp} - \xi| \leq e} g(\hat{\theta}^- - \xi) d\xi\right)}$$

where y is a sensor consistency measure. The value of y can be set by the user to select the weighting of consensus among the sensor measurements $X_1$-$X_N$. This can range from a value requiring complete agreement among the sensor measurements $X_1$-$X_N$ to requiring consensus within a specified error range. The system 10 in the presently preferred embodiment is based on the premise that consensus means that there is no artifactual error contamination 22 (see FIG. 2) in the sensor measurements $X_1$-$X_N$.

Equation (9) is derived from equation (6) and functions in a similar way. However, equation (9) is a special case that takes into account the unspecified artifactual model by assuming that whenever the error arises out of the artifactual model, the sensor measurement is contaminated by artifactual error contamination 22 (see FIG. 2).

For the hypotheses where only one of the sensors $S_1$-$S_N$ is assumed to be good (sensor combinations 4, 6, and 7 in Table 1), consensus cannot be used to remove doubt about the occurrence of artifact, so the worst case confidence is derived by setting y=1. Where consensus can be used to remove doubt that artifacts are involved, the formula for setting y is dependent upon the user's discretion about the type of artifactual error that is encountered. An effective measure of consensus is:

$$y_{hyp} = 1 - \left( \frac{\int_{|\hat{\theta}_{hyp} - \xi| \leq e; \xi \leq \theta_{max}, \xi \geq \theta_{min}} \hat{f}(X_{hyp} - \xi) g(\hat{\theta}^- - \xi) d\xi}{\int_{\theta_{min}}^{\theta_{max}} \hat{f}(X_{hyp} - \xi) g(\hat{\theta}^- - \xi) d\xi} \right) \quad (10)$$

It should be noted that the term in brackets is the application of the original Bayes Formula of equation (6) for the case where no contamination by the artifactual error contamination 22 is assumed. As described before, it provides a very good measure of consensus. If there is exact agreement of the sensor values and the past estimate, the term in brackets approaches 1.00, and the y value approaches 0.00. But if there is close, but not exact, agreement between the sensors, the y value could be anywhere from 0.0 to 1.0 depending upon the level of agreement. This approach is also convenient because the integrals in equation (10) already need to be computed for the remaining part of the confidence level computation.

By employing Huber's theorem, the unspecified artifactual model is also accounted for by determining the highest likelihood (assuming the "worst" artifactual model characteristic) that the estimate is outside the accepted tolerance. This calculation also depends very strongly upon both the epsilon value of equation (7) and the prediction error model 28. If the epsilon value is negligibly small, then the likelihood of artifact is correspondingly small. If the prediction error model 28 is such that the parameter cannot change beyond the acceptable tolerance from one reading to the next, then the likelihood of artifact is also small. In such circumstances, the regular Bayesian model of equation (7) can be used, since it is adequate for deciding if a particular reading is contaminated by the artifactual error contamination 22 even without consensus among the sensors $S_1$-$S_N$.

One final unknown in equation (9) that remains to be considered are the epsilon values, which are indicative of the probability of contamination by the artifactual error contamination 22 (see FIG. 2). If the probability of contamination by the artifactual error contamination 22 of each of the sensors $S_1$-$S_N$ remained almost the same from case to case, then the epsilon values could be estimated from the vast quantity of data, and applied to equation (9). But analyses of sensor performance data reveals that this is not the case. To account for the unknown probability of artifact, the system 10 treats each of the sensors $S_1$-$S_N$ as being equally susceptible to contamination by the artifactual error contamination 22. Instead of merely finding which hypothesis has the highest probability of being correct, the system 10 finds the hypothesis that can withstand the highest a priori probability of artifactual error contamination 22 and still be a better option than sensor combination 8 (see Table 1), in which all sensors are contaminated by the artifactual error contamination.

To achieve this goal, the confidence calculator 26 recalculates the confidence level to be the maximum a priori probability of contamination by the artifactual error contamination 22 (maximum epsilon) such that the minimum probability of being correct, calculated by equation (9), will exceed the probability of sensor combination 8 in Table 1 being the correct hypothesis. It should be noted that sensor combination 8 from Table 1 is the only hypothesis that does not incorporate sensor measurements $X_1$-$X_3$ in the estimation process at all because sensor combination 8 assumes all sensor measurements are affected by the artifactual error contamination 22. Thus, the fused estimate from sensor combination 8 is based solely on statistical prediction and not on any current sensor measurements $X_1$-$X_8$.

The principle of selecting the hypothesis with the highest probability of being contaminated by the artifactual error contamination 22 while also having a minimum probability of being correct that exceeds the probability of the hypothesis of sensor combination 8 being correct is illustrated by equation (11) below:

$$\max_{hyp}\left(Sup\epsilon_{hyp}: \left(\inf_f P(|\hat{\theta}_{hyp} - \theta| \leq e/X_{hyp}, \hat{\theta}^-) \geq P(|\hat{\theta}_8 - \theta| \leq e/\hat{\theta}^-)\right)\right) \Rightarrow \quad (11)$$

$$\begin{cases} \theta = \hat{\theta}_{hyp}*, C = \max(\epsilon_{hyp}*) & \text{if } \max(\epsilon_{hyp}*) > 0 \\ \hat{\theta} = \hat{\theta}_8, C = P(|\hat{\theta}_8 - \theta| \leq e/\hat{\theta})*C^- & \text{if } \max(\epsilon_{hyp}*) \leq 0 \end{cases}$$

where C is the calculated confidence value and $C^-$ is the confidence in the previous estimate.

The left hand portion of the equation (11) describes the search for the hypothesis that can withstand the highest probability of artifact before having to resort to sensor combination 8. Thus, only hypotheses from sensor combinations 1–7 are considered. The right hand portion of equation (11) states that the estimate and maximum epsilon value corresponding to the best hypothesis, are selected as the best estimate and the corresponding confidence level. However, if this maximum probability of artifact is less than zero, which is not credible, then the estimate corresponding to hypothesis 8 is selected. This is the past fused estimate $\hat{\theta}^-$. The confidence in this past fused estimate $\hat{\theta}^-$ is an "aged" measure of its previous confidence level, namely its the previous confidence level multiplied by the probability of being correct for hypothesis 8.

The system 10 measures the confidence level for each of the hypotheses in a manner that takes into account the worst case scenarios in terms of probabilities of artifact and artifactual error models. This permits the system 10 to select the best estimate and compute its corresponding confidence level. The system 10 uses accurate models of parameter variability and sensor error to obtain discriminating measures of confidence even under such difficult assumptions. The accuracy of the fused estimate FE comes from the ability of the system 10 to use consensus to help in achieving high confidence estimates, which can be used to refine the models from case to case, and to adapt them from moment to moment. As those skilled in the art can appreciate, this accuracy is difficult to achieve in the presence of high levels of contamination by the artifactual error contamination 22 and significant physiologic differences from case to case if only one sensor is available. Thus, the confidence calculator 26 of system 10 produces the fused heart rate estimate FE as well as a confidence level indicative of the confidence of the system in the fused estimate FE. As previously discussed, the system 10 is adaptive because the results of the current measurement are used to modify the sensor error model and the prediction error model.

The fused estimate FE and the confidence level generated by the confidence calculator 26 are used to refine the parameters $\hat{R}$ and $\hat{Q}$, which characterize the Gaussian PDF of the sensor error model 27 and the Gaussian PDF of the prediction error model 28, respectively. As previously discussed, the correlation values R and Q are required to implement the Kalman filters $KF_1$-$KF_8$ and to compute the confidence levels. Ideally, the variable Q is defined as the variance of the variability of the physiological parameter and is defined by equation (12) below as:

$$Q = E\{(\theta - \theta^-)^2\} \quad (12)$$

where $E\{\}$ is an expected value, $\theta$ is the current true heart rate value, and $\theta^-$ is the past true heart rate value. However, it is impossible to determine the true value for Q because the current true heart rate value $\theta$ and the past true heart rate value $\theta^-$ are not known. The current and past heart rate values can only be estimated and may contain errors. Therefore, the value for Q can only be estimated. This estimate is shown herein by the value "$\hat{Q}$" which indicates that the value is an estimate of Q.

In essence, the estimate of Q, which is the average square "nominal" change in the parameter from moment to moment. The variability factor changes from case to case, and changes slowly over time. An adaptive algorithm used to estimate $\hat{Q}$ is given by equations (13) and (14) below:

$$\hat{Q}_N = (1 - \rho_Q)*\hat{Q}_{N-1} + \rho_Q*(\hat{\theta} - \hat{\theta}^-)^2 \quad (13)$$

if there is a high consensus in the past and present estimates and $$\hat{Q}_N = \hat{Q}_{N-1} \text{ otherwise} \quad (14)$$

where N is an iteration number of the estimate, and $\rho_q$ is an adaptation constant ranging from 0 to 1 if the accepted hypothesis assumes at least two good sensors. If the accepted hypothesis assumes less than two good sensors, then the value of $\hat{Q}$ is not updated, as indicated by equation (14) where the current value of $\hat{Q}$ is defined as the previous value $\hat{Q}_{N-1}$.

The adaptive estimate is simply a moving average of accurate parameter variations. It should be noted that the rate of adaptation depends upon the size of the user-defined adaptation constant $\rho_Q$. As seen in equation (13), if the adaptation constant $\rho_Q$ is high (approaching 1) then the latest estimate of rate of change replaces the previous estimate completely. On the other hand, if the adaptation constant $\rho_Q$ is low (approaching 0), then there is no change in the estimate of $\hat{Q}$ based upon the latest estimates. As those skilled in the art can appreciate, the optimal setting of the constant depends upon the variability of $\hat{Q}$. Since this is also an unknown, a reasonably conservative setting where $\hat{Q}$ varies slowly is applied. The Kalman filters $KF_1$-$KF_8$ provide the interim fused estimates $\hat{\theta}_1$-$\hat{\theta}_8$, respectively based on a weighting of the sensor measurements $X_1$-$X_3$, the past fused estimate $\hat{\theta}^-$, and the values $\hat{Q}$ and $\hat{R}$. Elements that are considered less reliable are given less weighting by the Kalman filters $KF_1$-$KF_8$. In practice, $\hat{Q}$, which is a measure of the variance of the heart rate variability, will be larger than the elements of $\hat{R}$, and will thus be weighed considerably less than the sensor values in arriving at a Kalman estimate. The value for $\hat{Q}$ is initialized as the square of the highest possible change, from sample to sample, that physiologic credibility will allow. In the presently preferred embodiment, equation (15) below provides an estimate for the value $\hat{Q}$:

$$\hat{Q} = \max\{e^2, \hat{Q}_N\} \tag{15}$$

where $e$ is the maximum allowable error and $\hat{Q}_N$ is the adaptive estimate given by equations (13) and (14) above. The net result of using equation (15) is a greater reliance on the current sensor measurements than on the past fused estimate.

The ideal R value is a matrix that represents the variance of the sensor error from sensor measurements $X_1$-$X_3$ deemed to be good (i.e., not affected by the artifactual error contamination 22). The elements of R are defined as:

$$r_{ij} = E\{(\theta - x_i)^*(\theta - x_j)\} \tag{16}$$

where i and j are positions in the matrix for corresponding sensor measurements and E is the expected value of the observations. The main diagonal elements of the matrix represent the average square error of the sensor measurements $X_1$-$X_3$ (i.e., the variance). For example, $r_{1,1}$ is the error variance of sensor measurement $X_1$. The remaining elements are their cross-correlations (i.e., the measure of whether the occurrence of the errors is related). For example, $r_{1,2}$ is the error cross-correlation of sensor measurements $X_1$ and $X_2$, respectively. As discussed above with respect to equation (12), the ideal values of $r_{ij}$ cannot be determined because the true heart rate $\theta$ is unknown. Therefore, an estimate of $r_{ij}$ must be used to determine R values.

The nominal error variance is expected to vary from case to case, but it is not expected to vary over time. As a result, a recursive rather than adaptive algorithm may be used to estimate these elements. The recursive estimate is equivalent to a batch average of accurate sensor error estimates, which approaches the true value as more samples are used in its computation. The accuracy in the sensor error estimates is dependent upon the number of sensors fused. In order to estimate the nominal error values, only in cases when the accepted hypotheses involve more than one sensor that is within the limits of tolerance, an update is carried out using the following:

$$\hat{r}_{ij}^N = \hat{r}_{ij}^{N-1} + \frac{((\hat{\theta} - x_1)^*(\hat{\theta} - x_j) - \hat{r}_{ij}^{N-1})}{N-1} \text{ if } |(\hat{\theta} - x_i)| \leq e \text{ and } |(\hat{\theta} - x_j)| \leq e \tag{17}$$

where $r_{ij}$ is an element $(i, j)$ of $\hat{R}$ matrix and N is an iteration number of the estimate.

Those skilled in the art will understand that the number N in equation (17) is not identical to the number N in equation (13). Each value N in equations (13) and (17) represent the iteration number for the refinement of $\hat{Q}$ and $\hat{r}_{ij}$, respectively. However, the refinement of the values for $\hat{Q}$ and $f_{ij}$ is performed independently. Similarly, values for each element in the $\hat{R}$ matrix is analyzed independently. Thus, the iteration number N in equation (17) is different for each element in the $\hat{R}$ matrix. For example, the element $\hat{r}_{1,1}$ is analyzed independently of the element $\hat{r}_{1,2}$ and thus have unrelated iteration numbers N.

It should be noted that equation (17) is similar to equation (13) except that equation (17) is simply an averaging process that does not require the storage of past values of sensor error estimates. By setting the "adaptation constant" as $$\frac{1}{N-1},$$

equation (17) can be derived. The size and elements of the $\hat{R}$ matrix vary with the particular type of Kalman Filter that is implemented. Only the elements of $\hat{R}$ representing the sensor measurements $X_1$-$X_3$ that are assumed to be good in a particular hypothesis are used. The R matrix is initialized with values which assume worse case conditions for the type of error, as shown in equation (18) below:

$$\hat{r}_{ij} = \begin{cases} e^2 & i = j \\ 0 & i \neq j \end{cases} \tag{18}$$

The average square error is set to the "$e^2$" value, which is the highest possible value that the variance of nominal sensor error can assume. The cross-correlations are assumed nonexistent.

Thus, the system 10 can adaptively estimate the value $\hat{Q}$ which characterizes sensor variability on-line and recursively estimate the values $\hat{R}$ which characterizes nominal sensor error on-line. Both the values $\hat{Q}$ and $\hat{R}$ are essential to obtaining optimal Kalman estimates of the parameter. The values $\hat{R}$ and $\hat{Q}$ are also essential to obtaining highly discriminating confidence levels to select the best estimate and provide a corresponding confidence measurement. The system 10 can be readily incorporated into a conventional digital computer (not shown). However, the data processing power of a digital signal processor (not shown) can greatly enhance the overall performance of the system 10. The present invention is not limited by the particular platform on which the system 10 is implemented.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for estimation of heart rate subject, the system comprising:

a plurality of sensors coupled to the subject, each providing a physiological signal capable of producing a heart rate measurement;

a filter circuit receiving said heart rate measurements and producing a fused heart rate estimate for each possible combination of said heart rate measurements from said plurality of sensors in which each of said heart rate measurements in said combinations are considered to be acceptable or unacceptable; and a confidence calculator coupled to said filter circuit to receive said fused heart rate estimates and to determine a confidence level value for each of said fused heart rate estimates indicative of an accuracy of each of said fused heart rate estimates, said confidence calculator selecting said one of said fused heart rate estimates as the estimated heart rate based on said confidence level.

2. The system of claim 1 wherein said filter circuit is a Kalman filter for each of said possible combinations, said Kalman filter circuit using past heart rate estimates and a statistical measure of contamination of said heart rate measurements by nominal error to produce said fused heart rate estimates.

3. The system of claim 2 wherein said statistical measure of nominal error contamination includes a Gaussian probability density function of said nominal error contamination, said Kalman filter using said Gaussian probability density function to produce said fused heart rate estimates.

4. The system of claim 1 wherein said filter circuit includes a statistical filter and includes a statistical measure of heart rate variability, said filter circuit using said statistical measure of heart rate variability to produce said fused heart rate estimates.

5. The system of claim 4 wherein statistical measure of heart rate variability is a Gaussian probability density function of heart rate variability, said filter circuit using said Gaussian probability density function of heart rate variability to produce said fused heart rate estimates.

6. The system of claim 1 wherein said heart rate measurements are susceptible to contamination by artifactual error, said contaminated heart rate measurements producing an unacceptable heart rate measurement, said confidence calculator performing a statistical analysis of said fused heart rate estimates to determine a statistical probability of contamination of each of said fused heart rate estimates by said artifactual error.

7. The system of claim 6 wherein said filter circuit is a statistical filter and includes a statistical measure of nominal error contamination affecting said heart rate measurements, said confidence calculator combining said statistical measure of nominal error contamination and said statistical probability of contamination of each of said fused heart rate estimates by said artifactual error to determine said selected fused heart rate estimate.

8. The system of claim 6 wherein said confidence calculator calculates a minimum confidence value for one of said measurement combinations for which all of the physiological signals are assumed to be contaminated by said artifactual error, said confidence calculator further calculating a confidence value for remaining measurement combinations using a worst-case probability of contamination by said artifactual error while also having a minimum probability of said confidence level exceeding said minimum confidence level, said selected fused heart rate estimate having the greatest confidence value.

9. The system of claim 1, further including a statistical model for heart rate variability, said confidence calculator using said statistical model to determine said confidence level and modifying said statistical model following the selection of said selected fused heart rate estimate.

10. The system of claim 1, further including a statistical model for sensor error to characterize susceptibility of said sensors to nominal error contamination, said confidence calculator using said statistical model to determine said confidence level and modifying said statistical model following said selection of said selected fused heart rate estimate.

11. A system for fusion of physiological sensor measurements in a subject having a plurality of sensor coupled thereto, each of the sensors producing a sensor measurement related to a physiological parameter, the system comprising:

a statistical model affecting the fusion of the sensor measurements;

a statistical filter circuit receiving the sensor measurements and said statistical model and producing a fused parameter estimate for each possible combination of the sensor measurements from the plurality of sensors in which each of the sensor measurements in said combinations are considered to be acceptable or unacceptable; and a confidence calculator coupled to said filter circuit to receive said fused parameter estimates and to determine a confidence level for each of said fused parameter estimates indicative of an accuracy of each of said fused parameter estimates, said confidence calculator selecting one of said fused parameter estimate as a final parameter estimates based on said confidence level.

12. The system of claim 11 wherein said filter circuit also receives a previous estimate of the final parameter estimate selected by said confidence calculator, said filter circuit producing said fused parameter estimates based on the sensor measurements, said statistical model and said previous estimate.

13. The system of claim 11 wherein said statistical model is a parameter variability statistical model characterizing changes in the parameter over time and said filter circuit produces said parameter estimates using said parameter variability statistical model.

14. The system of claim 13, further including a sensor measurement error statistical model characterizing susceptibility of the sensor measurements to nominal error contamination, said filter circuit producing said fused parameter estimates using said parameter variability statistical model and said sensor error statistical model.

15. The system of claim 11 wherein said statistical model is a sensor measurement error statistical model characterizing susceptibility of the sensor measurements to nominal error contamination, said filter circuit producing said parameter estimates using said sensor error statistical model.

16. The system of claim 15, further including a parameter variability statistical model characterizing changes in the parameter over time, said filter circuit producing said parameter estimates using said sensor error statistical model and said parameter variability statistical model.

17. The system of claim 11 wherein said confidence calculator alters said statistical model following the selection of said parameter estimate, whereby the system is adaptive by using said final parameter estimate to alter said statistical model.

18. The system of claim 11 wherein said filter circuit is a Kalman filter for each of said possible combinations, each of said Kalman filters using a previous parameter estimate and said statistical model to produce said fused parameter estimates.

19. The system of claim 18 wherein said statistical model is a sensor measurement error statistical model having a Gaussian probability density function characterizing susceptibility of the sensor measurements to nominal error contamination, said Kalman filter using said Gaussian probability density function to produce said fused parameter estimates.

20. The system of claim 18 wherein said statistical model is a parameter variability model having a Gaussian probability density function characterizing changes in the parameter over time, said Kalman filter using said Gaussian probability density function to produce said fused parameter estimates.

21. The system of claim 11 for use with physiological sensor measurements that are susceptible to contamination by artifactual error, said contaminated physiological sensor measurements being considered unacceptable, said confidence calculator analyzing said fused parameter estimates to determine a statistical probability of error of each of said fused parameter estimates caused by said artifactual error.

22. The system of claim 21 wherein said statistical model is a sensor error statistical model characterizing the susceptibility of the sensor measurements to nominal error contamination, said confidence calculator combining said sensor error statistical model and said statistical probability of contamination of each of said fused parameter estimates by said artifactual error to determine said final parameter estimate.

23. The system of claim 21 wherein said confidence calculator calculates a minimum confidence value for one of said measurement combinations for which all of the physiological sensor measurements are considered unacceptable, said confidence calculator further selecting calculating a confidence value for remaining measurement combinations using a worst-case probability of contamination by said artifactual error while also having a minimum probability of said confidence level exceeding said minimum confidence level, said confidence calculator selecting as said final parameter estimate the fused parameter estimate with a maximum confidence value.

24. A method for fusion of sensor measurements in a subject having a plurality of sensor coupled thereto, each of the sensors producing a sensor measurement related to a physiological parameter, the method comprising the steps of:

generating a statistical model affecting the fusion of the sensor measurements;

producing a fused parameter estimate based on the sensor measurements and said statistical model for each possible combination of the sensor measurements from the plurality of sensors in which each of the sensor measurements in said combinations are considered to be acceptable or unacceptable;

determining a confidence level value for each of said fused parameter estimates indicative of an accuracy of each of said parameter estimates; and selecting a final parameter estimate based on said confidence level.

25. The method of claim 24 wherein said step of producing said fused parameter estimates bases said fused parameter estimates on the sensor measurements, said statistical model and a previous final parameter estimate.

26. The method of claim 24 wherein said statistical model is a parameter variability statistical model characterizing changes in the parameter over time, and said step of producing said fused parameter estimates uses said parameter variability statistical model.

27. The method of claim 26, further including the step of generating a sensor measurement error statistical model characterizing susceptibility of the sensor measurements to nominal error contamination, and said step of producing said fused parameter estimates uses said parameter variability statistical model and said sensor error statistical model.

28. The method of claim 24 wherein said statistical model is a sensor measurement error statistical model characterizing susceptibility of the sensor measurements to nominal error contamination, and said step of producing said fused parameter estimates uses said sensor measurement error statistical model.

29. The method of claim 28, further including the step of generating a parameter variability statistical model characterizing changes in the parameter over time and said step of producing said fused parameter estimates uses said sensor measurement error statistical model and said parameter variability statistical model.

30. The method of claim 24, further including the step of altering said statistical model following said step of selecting said final parameter estimate, whereby the method is adaptive by using said selected final parameter estimate to alter said statistical model.

31. The method of claim 24 wherein said step of producing said fused parameter estimates is performed by a Kalman filter for each of said possible combinations and uses a previous final parameter estimate and said statistical model in said Kalman filters to produce said fused parameter estimates.

32. The method of claim 31 wherein said statistical model is a sensor error statistical model having a Gaussian probability density function characterizing susceptibility of the sensor measurements to nominal error contamination, and said step of producing said fused parameter estimates in said Kalman filters uses said Gaussian probability density function to produce said fused parameter estimates.

33. The method of claim 31 wherein said statistical model is a parameter variability model having a Gaussian probability density function characterizing changes in the parameter over time, and said step of producing said fused parameter estimates in said Kalman filters uses said Gaussian probability density function to produce said fused parameter estimates.

34. The method of claim 24 for use with sensor measurements that are susceptible to contamination by artifact, said contaminated sensor measurements being considered unacceptable, said step of calculating said confidence level analyzing said fused parameter estimates to determine a statistical probability of contamination of each of said fused parameter estimates by said artifact.

35. The method of claim 34 wherein said statistical model is a sensor measurement error statistical model characterizing the susceptibility of the sensors to nominal error contamination, the method further including the step of combining said sensor measurement error statistical model and said statistical probability of contamination of each of said fused parameter estimates by said artifact to determine said fused parameter estimate, said step of calculating said confidence value using said combined sensor measurement error statistical model and said statistical probability of contamination by said artifact.

36. The method of claim 34 wherein said step of calculating said confidence level calculates a minimum confidence value for one of said measurement combinations for which all physiological sensor measurements are considered unacceptable, the method further including the steps of calculating a confidence value for each of the remaining ones of said measurement combinations using a worst case a priori probability of contamination by said artifact while also having a minimum probability of said confidence level exceeding said minimum confidence level, said step of selecting said final parameter estimate selecting one of said fused parameter estimates with a maximum confidence value.

* * * * *

UNITED STATES PATENT AND TRADEMARK OFFICE
CERTIFICATE OF CORRECTION

PATENT NO. : 5,626,140
DATED : May 6, 1997
INVENTOR(S) : Jeffrey M. Feldman and Mehboob H. Ebrahim It is certified that error appears in the above-indentified patent and that said Letters Patent is hereby corrected as shown below:

In column 18, claim 1, line 55, following "rate" please insert --in a--.

Signed and Sealed this

Twenty-first Day of October 1997

*Attest:*

BRUCE LEHMAN

*Attesting Officer*        Commissioner of Patents and Trademarks